United States Patent Office 3,523,213
Patented Aug. 4, 1970

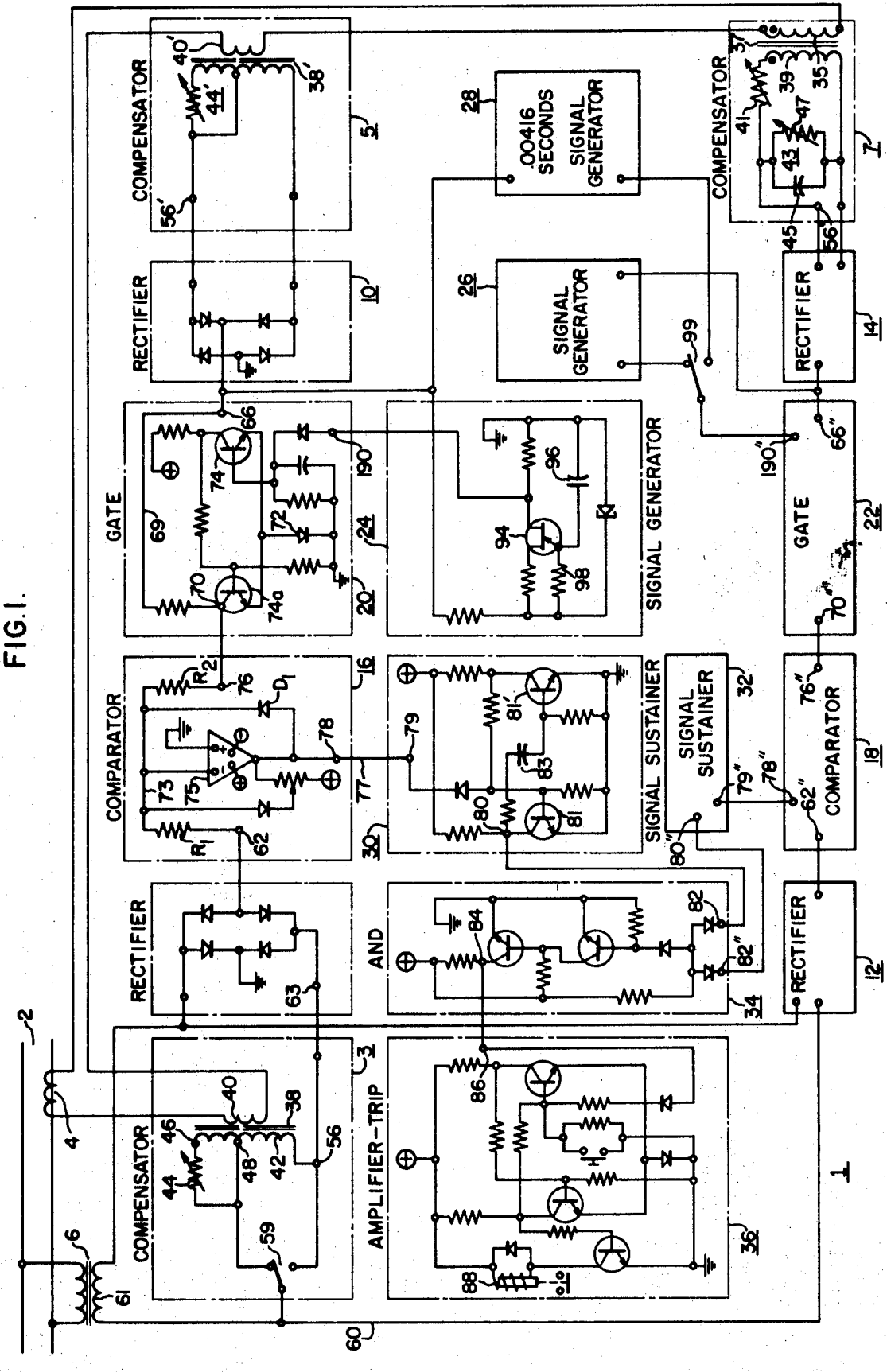

3,523,213
DISTANCE RELAY WITH RECTANGULAR
CHARACTERISTICS
William K. Sonnemann, Austin, Tex., assignor to Westinghouse Electric Corporation, Pittsburgh, Pa., a corporation of Pennsylvania
Filed Apr. 19, 1968, Ser. No. 722,776
Int. Cl. H02h 3/38
U.S. Cl. 317—27
15 Claims

ABSTRACT OF THE DISCLOSURE

An apparatus for comparing the relative magnitudes of two alternating current quantities at a fixed point in the cycle of one of the quantities and which apparatus is particularly useful as a distance relay for protecting a desired section of an alternating current transmission network.

BACKGROUND OF THE INVENTION

This invention relates to apparatus for comparing periodically, the instantaneous magnitudes of a pair of alternating electrical quantities. It is particularly useful in a distance-type fault protecting relay for an alternating current power transmission network.

It is well known in the art to express the characteristics of a distance-type relay by means of a so-called R-X diagram. Distance relays having circular characteristics are well known whether the circle is centered at the origin or whether the center of the circle is displaced from the origin. A well known plot of the characteristic of a reactance relay is a straight line parallel to the R axis. Other straight line characteristics are known. An elliptical characteristic is described and claimed in my United States Pat. No. 3,303,390 dated Feb. 7, 1967.

SUMMARY OF THE INVENTION

The modern power system increasingly demands more sophisticated relay performance to deenergize a faulted section of a transmission line in the event of a fault therein and refrain from such a deenergization of the line if the disturbance therein is not fault caused. This has brought about the desirability of providing a distance relay having a rectangular characteristic and more particularly a relay in which the length and the width of the rectangle are separately adjustable. It is further desirable that the center of the rectangle be controllably displaced from the origin.

It is therefore an object of this invention to provide a new and improved condition sensing apparatus having a rectangular characteristic.

It is a further object of this invention to provide such an apparatus which may be used as a distance-type relay for protecting a predetermined portion of a power transmitting network.

A still further object of this invention is to provide such a distance relay in which the length and width of the rectangular characteristic may be individually controlled.

Another object of this invention is to provide a distance type relay in which the rectangle may be adjustably displaced from the R-X origin.

Other objects of this invention will be apparent from the specification, the appended claims and the drawings in which drawings:

BRIEF DESCRIPTION OF THE DRAWINGS

FIG. 1 is a partially schematic and partially block diagram of a power network fault protecting system embodying the invention;

DESCRIPTION OF THE PREFERRED EMBODIMENT

Figure 4:
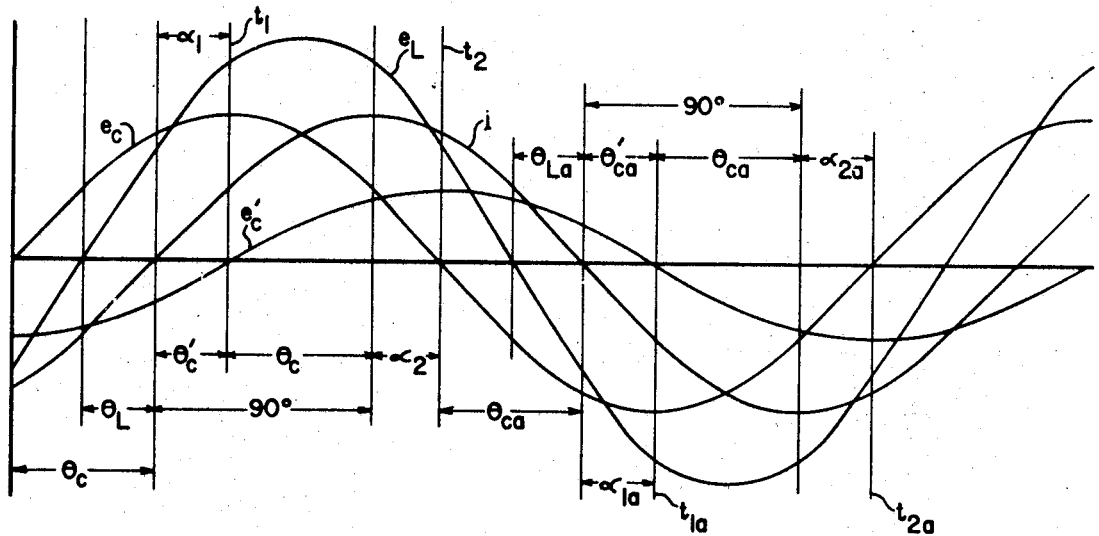

Referring to the drawings by characters of reference the numeral 1 indicates generally a control apparatus for an electrical transmission line 2 in which there is provided a current transformer 4 and a voltage or potential transformer 6 for extracting from the electric line or network 2 signals proportional to the voltage and current present at the location of the control apparatus 1.

The control apparatus 1 includes a plurality of compensators or impedance devices 3, 5 and 7, a plurality of rectifiers 8, 10, 12 and 14, a pair of comparators 16 and 18, a pair of gates 20 and 22, pulse or signal generators 24, 26 and 28, a pair of signal maintaining networks or signal sustainers 30 and 32, an AND network 34 and an amplifier-trip network 36. The specific details of the above named networks and devices may vary widely and form no part of the invention. Suitable circuitry to accomplish my desired results is shown for illustrative rather than limitative purposes.

The compensators 3, 5 and 7 provide a voltage which leads the current signal supplied thereto by an angle $\theta_c$.

The compensator 7 provides a voltage which lags the current signal supplied thereto by an angle $(90° - \theta'_c)$ and comprises an auxiliary current transformer 37 as distinguished from the air gap transformer 38 of the compensators 3 and 5. The secondary winding 39 of the transformer 37 is connected through a variable resistor 41 across a network 43 comprising parallelly connected capacitor 45 and resistor 47. The output signal of the compensator 7 is the signal appearing across the network 43. Each of the impedance devices 3 and 5 are identical so only the compensator 3 will be described in detail. The compensator 3 includes an air gap transformer or non-saturating impedance device 38 having a primary winding 40 and a tapped secondary winding 42. A variable loading resistor 44 is connected between one end terminal 46 and an intermediate terminal 48 of the winding 42. These compensators 3 and 5 are similar to the compensators "CP" shown in my Pat. No. 2,973,459 dated Feb. 28, 1961. The terminal 48 is connected to the upper terminal of a single-pole double-throw switch 59. The switch 59, illustrated in a position in which the compensator 3 is effective has its single pole connected to the voltage supplying conductor 60 which connects to the ungrounded terminal of the secondary winding 61 of the transformer 6 and its lower terminal connected to the lower end terminal 56 of the winding 42 and to an output terminal 56. The output terminal 56 is connected to the input terminal 63 of the rectifier 8. When the switch 59 is in its down position, the conductor 60 is connected directly to the input terminal 63 and the compensator 3 is rendered ineffective. As will be explained below the switch position determines whether the apparatus 1 will operate according to the R-X diagram of FIG. 2 or according to the diagram of FIG. 3. The alternating voltage signal derived from the transformer 6, with or without the superimposition of the voltage provided by the compensator 3, as rectified by the full wave rectifier 8 and the resulting pulsating unidirectional signal is supplied to a first input terminal 62 of the comparator 16.

The primary winding 40' of air gap transformer 38' of the compensator 5 has the primary winding 40 of the compensator 3 and the primary winding 35 of the transformer 37 are all connected in series across the secondary winding of the current transformer 4 whereby they are energized with an electrical signal $i$ (FIG. 4) which is a function of the current in the line 2. This alternating signal $i$ is transformed by the compensators 3, 5 and 7 into alternating phase displaced quantities which have a magnitude proportional to the product of the current of the line 2 and the magnitude of the impedance of the compensators 3, 5 and 7 respectively. The curve $e_c$ and $e'_c$ represent the alternating potential quantities at the output terminals of the compensators 5 and 7. The quantities $e_c$ and $e'_c$ are phase shifted from the signal $i$ by magnitudes determined by the compensators 5 and 7 to provide voltage waves $e_c$ and $e'_c$ leading phase angles $\theta_c$ is chosen such that the peak or 90 degrees point of the wave $e_c$ occurs at the sampling time $t_1$. The measuring or sampling point $t_2$ is located exactly at a 90 degree lagging time interval with respect to the sampling point $t_1$. The compensator 7 is adjusted to cause the peak or 90 degree point of the curve $e'_c$ to occur at time $t_2$ which is at a lagging phase angle $\theta'_c$ where $\theta'_c$ plus $t_c$ is equal to 90 degrees.

The signal $e_c$ is rectified by the rectifier 10 and supplied to the input terminal 66 of the gate 20 as a unidirectional pulsating quantity. The gate 20 controls the periods during which the signal output of the rectifier 10 is applied to the second input terminal 76 of the comparator 16. The transistor 74a of the gate 20 is normally maintained conducting whenever the positive bus 69 thereof is energized whereby the output terminal 70 of the gate 20 is normally clamped to ground through the normally conducting transistor 74a and the diode 72. The gate 20 is opened to pass the signal to the input terminal of the comparator 16 by the supplying of a conducting signal to a transistor 74 from the signal generator 24. The conduction of transistor 74 causes the transistor 74a to become non-conducting and permits the pulsating signal supplied by the rectifier 10 to energize the input terminal 76 of the comparator 16. The signal generator 24, as will be explained below, is arranged to provide the conducting signal to the gate 20 at the times $t_1$ and $t_{1a}$ which are at angles $\alpha_1$ and $\alpha_{1a}$ after the 0° and 180° points in the wave $i$. If the instantaneous magnitude of the signal supplied to the terminal 76 is less than the instantaneous magnitude of the signal supplied to the terminal 62, as is the indicated relation in FIG. 4, at the times $t_1$ or $t_{1a}$, no output signal will appear at the output terminal 78. If, however, the signal supplied to the input terminal 76 at the times $t_1$ or $t_{1a}$ are greater than the signal supplied to the input terminal 62 the comparator 16 will supply an output signal at its terminal 78.

More specifically the comparator 16 includes an operational amplifier 75 having a pair of input connections and an output connection. The + input connection is connected to ground and the − input connection is connected to a common bus 73. The bus 73 is connected through a resistor $R_1$ to the first input terminal 62 and through a second resistor $R_2$ to the second input terminal 76. The output current of the rectifier 8 is polarized to flow from the − terminal onto the bus 73 while the output current of the rectifier 10 is polarized to flow from the bus 73 into the − terminal. The resistance magnitudes of the resistors $R_1$ and $R_2$ are chosen such that when the instantaneous magnitudes of the quantities $e_L$ and $e_c$ at the instant $t_1$ are equal the sum of the currents through the resistors $R_1$ and $R_2$ are equal and no net current flows between the − terminal of the amplifier 75 and the bus 73. Under this condition no useful output signal will be present at the output terminal 78.

When the magnitude of the current through resistor $R_1$ is greater than the current flow through the resistor $R_2$ the difference current will flow from the − terminal into the bus 73 and the amplifier 73 will attempt to increase the potential at the terminal 78. Actually because of the diode $D_1$ no substantial increase occurs and the amplifier 75 will not saturate. If on the other hand the current through the resistor $R_2$ is greater than the current through the resistor $R_1$, the difference current will flow to the − terminal from the bus 73 and the differential amplifier 75 will produce a negative signal at the output terminal 78. This signal at the output terminal 78 is supplied to the signal sustaining or maintaining network 30 through a conductor 77 to its input terminal 79. As illustrated the network 30 takes the form of a monostable multivibrator which normally maintains its output terminal 80 clamped to ground potential due to the normally conducting transistor 81. When a negative signal is supplied to the input terminal of the sustainer 30 the base current in the transistor 81 is sufficiently reduced to cause the transistor 81 to decrease its emitter-collector current. This results in rendering the transistor 81' conducting and the transistor 80 non-conducting for a period dependent upon the charging time of the capacitor 83. When insufficient charging current flows through the capacitor 83, the transistor 81' returns to its normally blocked condition and the transistor 81 returns to its normally conducting condition. The capacitor 83 is chosen such that the time interval during which the transistor 81 is blocked does not substantially exceed 120 electrical degrees based on the frequency of the electric transmission line 2. In the normal operation of power lines in the United States this frequency would be 60 Hertz and the sustaining time of the maintaining network 30 at this frequency would be in the neighborhood of 6 milliseconds. The output signal of the sustainer 30 is supplied to one input terminal 82 of the AND network 34 as a positive signal during the non-conducting period of the transistor 81.

The second input signal for the AND network is derived due to the difference in the magnitudes of the signals supplied to the comparator 18 at the times $t_2$ and $t_{2a}$. One signal to the comparator 18 is supplied from the transformer 6 through rectifier 12 to its input terminal 62". The other input signal to the input terminal 76" is supplied from the compensator 7 through the rectifier 14. The compensator 7 as described above is energized by the current signal output of the current transformer 4. Its loading network is adjusted such that the output signal at its output terminal 56" is phase displaced (with a positive angle denoting a leading sense) by the angle $\theta_c - 90°$ from the wave $i$ and represented in FIG. 4 by curve $e'_c$. The quantity $e'_c$ rectified by the rectifier 14 is supplied to the input terminal 66" of the gate 22. When the gate 22 is open the rectified quantity $e'_c$ is supplied from its output terminal 70" to the input terminal 76" of the comparator 18. If at the times $t_2$ or $t_{2a}$ the instantaneous magnitude of the signal supplied to the input terminal 76" is greater than the instantaneous magnitude of the signal supplied to the input terminal 62," a pulse is supplied to the input terminal 79" of the signal sustainer or network 32. This network 32, like the network 30, will maintain a signal at its output terminal 80" for approximately 120 electrical degrees of the wave $i$. Since the wave $i$ will usually have a frequency of 60 hertz the interval will approach 6 milliseconds. When both of the input terminals 82 and 82" are energized by the sustaining networks 30 and 32, respectively, the AND network 34 will supply an output signal from its output terminal 84 to the input terminal 86 of the amplifier-trip network 36 whereby the trip relay 88 is energized to disconnect the line 2 from an electrical energy supplying bus (not shown) but in a manner well known to those skilled in the art.

The pulse or signal generators 24 and 26 are identical and are arranged to open the gates 20 and 22. The pulse generators 24 and 26 each include a unijunction transistor 94 and a timing capacitor 96 chargeable through a timing resistor 98. The timing capacitor 96 and resistor 98 of the generator 24 are arranged to cause the transistor 94 thereof to conduct and supply a gate opening pulse to the gate 20 at a phase angle $(\theta_c + \alpha_1)$ and $(\theta_{ca} + \alpha_{1a})$ with respect to the alternating quantity $e_c$ supplied thereto by the compensator. These angles are preferably chosen to be exactly 90° for a purpose which will be brought out below. Similarly, the generator 26 is energized by the quantity $e'_c$ and is arranged to supply a gate opening pulse to the gate 22 at the angle $(\theta'_c+\alpha_2)$ and $(\theta'_{ca}+\alpha_{2a})$ with respect to the alternating quantity $e'_c$ when angles are again preferably equal to 90°.

The rectifiers 10 and 14 reverse one of the half cycles of the wave of FIG. 4 and the angles with the subscript $a$ appended thereto are identical to the like designated and above described angles without the subscript $\alpha$. The duration of the measurement at angles $\alpha_1$, $\alpha_{1a}$, $\alpha_2$ and $\alpha_{2a}$ is very short and may approach 1 degree in the waves. This interval is preferably just long enough to actuate the associated one of the signal sustainers 30 or 32. The time interval of the sustainer is sufficient to sustain its output signal to the AND network 34 for not less than 90 degrees and for an interval thereafter, less than 180 degrees, which is sufficient to permit the AND network 34 to be actuated if the sustainers 30 and 32 are sequentially actuated. As described 120 electrical degrees have been found to be satisfactory.

A single pole double-throw switch 99 selectively connects the gate 190″ to the signal generator 26 or 28. The generator 26 is arranged to time the opening of the gate 22 from the wave $e'_c$ while the generator 28 times from the wave $e_c$ and its delay is substantially 90 degrees longer because of the 90 degree difference in the wave $e_c$ and $e'_c$.

It will now be appreciated that two conditions must exist in the control apparatus 1 for energization of the trip-relay 88 and opening of the breaker (not shown) to disconnect the line 2 from the energy supply bus (not shown). As will be shown below, the signal supplied from the comparator 16 will indicate that the operating condition of the line 2 is between the parallel lines 100 and 102 of FIG. 2 or between the parallel lines 104 and 106 of FIG. 3 depending upon whether the switch 59 is in its down position in which the compensator 3 is ineffective or whether the switch 59 is in its up position (as shown) in which the compensator 3 is effective. The signal supplied from the comparator 18 will indicate that the operating condition of the line 2 is between the parallel lines 108 and 110 of FIG. 2 or 112 and 114 of FIG. 3 depending upon the position of switch 59.

The equation for a straight line 100 displaced a distance $Z_c$ from the center of the axes R-X is defined by the equation $Z_c=Z_L \cos(\theta_c-\theta_L)$ where the angle $\theta_c$ is the angle of the phasor $Z_c$ with respect to the R axis, and the angle $\theta_L$ is the angle of a phasor $Z_L$ with respect to the same R axis. The equation may be applied to the disclosure by letting $Z_c$ be a quantity equal to the impedance of the transmission line 2 measured from the location of the control apparatus 1 to the remote location on the line 2 which is to be protected by the apparatus 1 and letting $Z_L$ be equal to the actual impedance of the line 2 and its load connected thereto as measured at the location of the apparatus 1. Based upon these premises, the instantaneous magnitude of the curve $e_c$, at sampling time $\alpha$, is represented by the equation $$e_c = iZ_c = I_m Z_c \sin(\alpha+\theta_c)$$

where $i$ is the current flowing in the line 2, $I_m$ is the maximum value of the current $i$, $\theta_c$ is the phase angle imparted to the compensator 5 and angle $\alpha$ is the angle at which sampling is to occur. The magnitudes of the curve $e_L$ which represents the line voltage at the location of the apparatus 1 may be represented by the equation at the time $\alpha$ by the equation $$e_L = iZ_L = I_m Z_L \sin(\alpha+\theta_L)$$

where $Z_L$ represents the actual operating impedance of the line 2 looking from the location of the apparatus 1 into the line 2 and angle $\theta_L$ represents the phase angle at which the line 2 is operating. Let us further assume that the sampling is to be done at the angle $90-\theta_c$ or at the angle $\alpha_1$ of FIG. 4. If the magnitudes of the instantaneous values of the curves $e_c$ and $e_L$ are equal at the time $t_1$, angle $\alpha_1$, then $$I_m Z_c \sin(\alpha_1+\theta_c) = I_m Z_L \sin(\alpha_1+\theta_L)$$

or $$I_m Z_c \sin(90-\theta_c+\theta_c) = I_m Z_L \sin(90-\theta_c+\theta_L)$$

and since the $$\sin(90-\theta_c+\theta_c=1)$$
$$Z_c = Z_L \sin(90-\theta_c+\theta_L)$$

Since $$\sin(90-\theta_c+\theta_L)$$

may be written as $$\sin(90-(\theta_c-\theta_L))$$

which is $$\sin 90 \cos(\theta_c-\theta_L) - \cos 90 \sin(\theta_c-\theta_L)$$

which reduces to $$\cos(\theta_c-\theta_L)$$

to produce the equation $$Z_c = Z_L \cos(\theta_c-\theta_L)$$

which, as stated above, is the equation for the straight line or in its preferred form, however, $$Z_L = \frac{Z_c}{\cos(\theta_c-\theta_L)} 100$$

It can be similarly shown that the equation of the line 102 may be represented by the quantity $$Z_c = -Z_L \cos(\theta_c-\theta_2)$$

or $$-Z_L = \frac{Z_c}{\cos(\theta_c-\theta_L)}$$

With the sampling time at the time $t_2$ or at the angle $90°+\alpha_2$ the sampling angle now becomes $(90-\theta_c+90)$ or $(180-\theta_c)$. Since the compensator 7 was chosen such that the angle $\theta'_c$ is equal to $\theta_c-90°$, the instantaneous value of curve $e'_c$ at sampling time $t_2$, may be expressed $$e'_c = iZ'_c = I_m Z'_c (\sin \alpha_2 + \theta'_c)$$

The instantaneous magnitude of the curve $e_L$ at the time $t_2$, angle $\alpha_2$, may be represented by the equation $$e_L = I_m Z_L \sin(\alpha_2+\theta_L)$$

If the magnitudes of the two curves $e'_c$ and $e_L$ are equal at the time $t_2$, then $$I_m Z'_c \sin(\alpha_2+\theta'_c) = I_m Z_L \sin(\alpha_2+\theta_L)$$

And this simplifies to $$Z'_c = Z_L \cos(\theta_L-\theta'_c)$$

or in a preferred form $$Z_L = \frac{Z'_c}{\cos(\theta_L-\theta'_c)}$$

which is the equation of a straight line 110 perpendicular to the line 100. The magnitude of $Z'_c$ as contrasted to its angle $\theta'_c$ is selected to control one dimension of the line 100.

The lines 102 and 108 are the negative values of the phasors $Z_L$ and represent the determination of the line impedance if the fault is behind the relay, in which case $e_L$ of FIG. 4 has opposite polarity to that illustrated and permit the completion of the impedance rectangle having its dimensions $2|Z_c|$ by $2|Z'_c|$. Therefore whenever the magnitude of the curve $e_c$ is equal to or greater than the magnitude of the curve $e_L$ at the time $t_1$ and that magnitude of the curve $e'_c$ is equal to or greater than the magnitude of the curve $e_L$ at the time $t_2$, the line impedance to the "reach point" will be within the upper half of the rectangle of FIG. 2 and will represent a fault within the reach of the apparatus 1. When this fault occurs, for the reasons advanced above, the relay 88 will be actuated and the line 2 disconnected from the power supplying busses.

Figure 2:
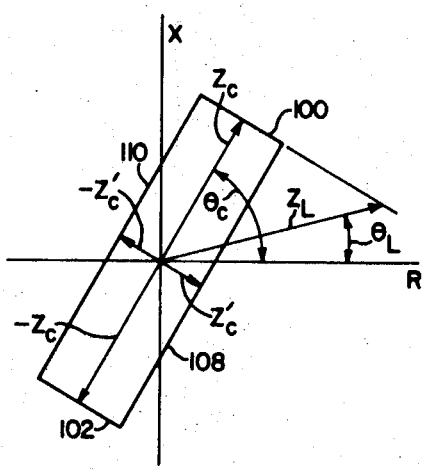
FIG. 2 illustrates an R-X characteristic of the apparatus which is centered about the origin of the R-X axes.
Figure 3:
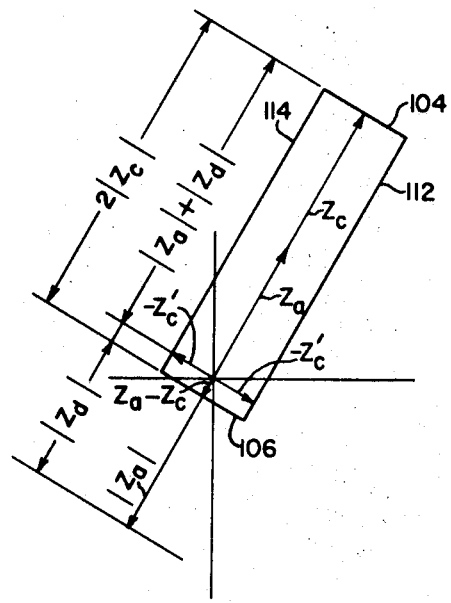
FIG. 3 illustrates a rectangular characteristic having its center displaced from the center of the R-X axes; and, FIG. 4 is a series of curves illustrating the operation of the apparatus of the invention.

With the arrangement illustrated in FIG. 2, the compensator 3 rendered ineffective by the switch 59, the apparatus 1 will also act to disconnect the line 2 in the event that the impedance in the direction away from the line 2 toward the power supplying busses whenever the line impedance $Z_L$ falls within the lower half of the rectangle. This may be desirable under some relaying instances and in others it may be undesirable. As illustrated in FIG. 3, this invention contemplates the movement of the rectangle into the first quadrant of the axes R-X. This movement is accomplished by the inclusion of the compensator 3 to provide a restraining voltage at the angle $\theta_c$ and of a magnitude $iZ_a$ which magnitude will depend upon the desired rearward reach of the apparatus 1. The effect of the compensator 3 is illustrated by the phasors $Z_a$ and $-Z_a$.

The magnitude of the restraint voltage $e_r$ produced by the compensator 3 may be represented by the equation $$e_r = e_L - iZ_a$$

At the time $t_1$ if the magnitudes of the quantities supplied to the comparator 16 are equal the quantity $e_r$ equals $e_c$. Since $$e_r = I_m Z_L \sin(\alpha_1 + \theta_L) - I_m Z_a \sin(\alpha_1 + \theta_a)$$

and $e_c = I_m Z_c \sin(\alpha_1 + \theta_L)$ and angle $\alpha_1 = (90 - \theta_c)$ We arrive at the equation $$Z_c = Z_L \cos(\theta_c - \theta_L) - Z_a \cos(\theta_a - \theta_c)$$

or $$Z_L = \frac{Z_c}{\cos \theta_c - \theta_L} + Z_a \frac{\cos(\theta_c - \theta_c)}{\cos(\theta_c - \theta_L)}$$

Line $\theta_a = \theta_c$ the equation reduces to $$Z_L = \frac{Z_a + Z_c}{\cos(\theta_c - \theta_L)}$$

which expresses the forward reach of the apparatus 1.

By applying a similar solution for the backward reach, $e_c = e_r$ at angle $\alpha_1$.

Whereby $$Z_c = -Z_L \cos(\theta_c - \theta_L) + Z_a \cos(\theta_a - \theta_c)$$

and $$Z_L = \frac{Z_a - Z_c}{\cos(\theta_c - \theta_L)}$$

which expresses the backward reach of the apparatus 1, which as graphically illustrated in FIG. 3 moves the rectangle upwardly along the phasor $Z_a + Z_c$ into the first quadrant. The choice of the magnitude $Z_a$ will determine the degree of movement of the rectangle.

Since numerous changes may be made in the above-described apparatus and different embodiments of the invention may be made without departing from the spirit thereof, it is intended that all matter contained in the foregoing description or shown in the accompanying drawings, shall be interpreted as illustrative and not in a limiting sense.

What is claimed and is desired to be secured by United States Letters Patent is as follows:

1. In an apparatus for comparing a pair of phase displaced sinusoidally alternating electrical quantities alternating at the same frequency, a first pair of input terminals for energization by a first electrical quantity which varies in magnitude and phase as a function of one of said pair of quantities, a second pair of input terminals for energization by a second electrical quantity which varies in magnitude and phase as a function of the other of said pair of quantities, a quantity comparator having first and second input circuits and an output circuit, an electrical quantity signal sustainer, said circuit means connecting said first pair of input terminals to said sustainer, said sustainer being operable to establish a third electrical quantity which is of a magnitude proportional to the magnitude of said first electrical quantity and phase displaced a first predetermined phase angle from said first electrical quantity, means connecting said sustainer to said first input circuit whereby said first input circuit is energized by said third quantity, second circuit means connecting said second pair of input terminals to said second input circuit, and first control means connected to said comparator and effective to render said comparator effective to compare the instantaneous magnitudes of said electrical quantities supplied to its said input terminals at a first predetermined instant and for a predetermined time duration in the cycle of a selected quantity of said pair of electrical quantities, said comparator being effective to alter the energized condition of said output circuit solely when the magnitude of one of the said electrical quantities supplied to one of its said input circuits is greater than the magnitude of the other of the said electrical quantities supplied to the other of its said input circuits.

2. The combination of claim 1 in which said second circuit means includes the output circuit of a second electrical quantity sustainer, means connecting said second sustainer to said first pair of input terminals for energization by said first electrical quantity, said second sustainer being effective to establish a fourth electrical quantity at its said output circuit, said fourth quantity being of a magnitude proportional to the magnitude of said first quantity and phase displaced a second predetermined phase angle from said first electrical quantity, said second circuit means being effective to energize said second input circuit with a fifth electrical quantity, said fifth electrical quantity being a function of the combined magnitudes of said second and fourth electrical quantities.

3. The combination of claim 2 in which said first and second predetermined phase angles are equal and said fifth electrical quantity is the difference in the magnitudes of said second and fourth electrical quantities.

4. The combination of claim 3 in which said predetermined phase angles are equal to the phase angle between said pair of electrical quantities which occurs when said pair of quantities represent voltage and current to an electrical network operating under fault conditions.

5. The combination of claim 1 in which there is provided a second quantity comparator having first and second input circuits and an output circuit, a second electrical quantity sustainer, third circuit means connecting said first pair of input terminals to said second sustainer, said second sustainer being operable to establish a fourth electrical quantity which is of a magnitude proportional to the magnitude of said first electrical quantity and phase displaced a second predetermined phase angle from said first electrical quantity, means connecting said second sustainer to said first input circuit of said second comparator whereby said first input circuit of said second comparator is energized by said fourth electrical quantity, third circuit means connecting said second pair of input terminals to said second input circuit of said second comparator, second control means connected to said second comparator and effective to render said second comparator effective to compare the instantaneous magnitudes of said electrical quantities supplied to its said input terminals at a second predetermined instant and for a predetermined time duration in the cycle of a selected quantity of said pair of electrical quantities, said second predetermined instants occurring each 180 degrees of said selected quantity, said second comparator being effective to alter the energized condition of said output circuit solely when the magnitude of one of the said electrical quantities supplied to one of its said input circuits is greater than the magnitude of the other of the said electrical quantities supplied to the other of its said input circuits, said first predetermined instants occurring each 180 degrees of said selected quantity, said first control means being operable to establish its said instants in alternating relation with said instants established by said second control means and with said instants appearing at 90 degree intervals of the cycle of said pair of quantities, and an operated network connected to said output circuit of each of said first and second comparing networks, said operated network being energized solely in response to the alteration of said output circuits of both said comparing networks within an interval not substantially greater than 180 degrees of said selected quantity.

6. The combination of claim 5 in which there is provided an electrical quantity sustainer connected between said output circuit of one of said comparator and said operated network, said maintaining device being effective subsequent to actuation by the alteration of said one comparing network to maintain its said electrical quantity for a time interval not substantially in excess of 90 degrees of said selected quantity.

7. In combination, first and second pairs of input terminals adapted to be energized by first and second sinusoidally varying electrical quantities, a comparator operable to compare two electrical quantities, said comparator having a pair of input connections for energizations by the quantities to be compared and having an output connection, a first compensator having input terminals and output terminals, said compensator being effective to provide an electrical quantity at its said output terminals which has an instantaneous magnitude proportional to the magnitude of an alternating electrical quantity which is at a predetermined phase angle relative to an alternating electrical quantity which is sufficient to said input terminals of said compensator, first means connecting said first pair of input terminals to a first input connection of said pair of input connections whereby said first input connection is energized by said first electrical quantity, a gating network having input and output connections and a control connection, said gating network being operable to pass an electrical quantity therethrough solely when actuated by a change in the magnitude of a control signal which is supplied to its said control connection, second means connecting said second pair of input terminals to said input terminals of said compensator and said output terminals of said compensator to a second input connection of said pair of input connections of said comparator, said second means including said gating network, and a control signal generator connected to said control connection to provide a change in the magnitude of the control signal supplied to said gating network to control the intervals during which said gating network is effective to pass an electrical quantity therethrough to said comparator being effective to provide an output signal at its said output connection solely when the magnitude of the quantity supplied to a predetermined one of its said input connections is greater than a predetermined portion of the magnitude of the quantity supplied to the other of its said input connections, and control means connected to said output connection of said comparator for actuations upon the occurrence of said output signal at said output connection of said comparator.

8. The combination of claim 7 in which said control signal generator is actuated in synchronism with the frequency of said first electrical quantity.

9. The combination of claim 8 in which there is provided a pair of full wave rectifiers, one of said rectifiers being included in said first means whereby a first pulsating unidirectional electrical quantity is supplied to said first input connection of said comparator, the other of said rectifiers being included in said second means whereby a second pulsating unidirectional electrical quantity is supplied said second input connection of said comparator.

10. The combination of claim 7 in which there is provided a second comparator for comprising two electrical quantities, said second comparator having a pair of input connections for energization by the quantities to be compared and having an output connection, a second compensator having input terminals and output terminals, said second compensator being effective to provide an electrical quantity at its said output terminals which has an instantaneous magnitude proportional to the magnitude of an alternating electrical quantity which is at a predetermined phase angle relative to an alternating electrical quantity which is supplied to said input terminals of said second compensator, third means connecting said first pair of input terminals to a first input connection of said pair of input connections of said second comparator whereby said first input connection of said second comparator is energized by said first electrical quantity, a second gating network having input and output connection and a control connection, said second gating network being operable to pass an electrical quantity therethrough solely when actuated by a change in the magnitude of a control signal which is supplied to its said control connection, fourth means connecting said second pair of input terminals to said input terminals of said second compensator and said output terminal of said second compensator to a second input connection of said pair of input connections of said second comparator, said fourth means including said second gating network, second control signal changing means connected to said control connection of said second gating network to provide a change in the magnitude of the control signal supplied to said second gating network to control the intervals during which said second gating network is effective to pass an electrical quantity therethrough to said second comparator, said second comparator being effective to provide an output signal at its said output connection solely when the magnitude of the quantity supplied to a predetermined one of its said input connections is greater than a predetermined proportion of the magnitude of the quantity supplied to the other of its said input connections, and an AND network said control means being connected through said AND network to said output connection of each of said comparators so that said control means is actuated solely in response to the occurrence of sequential output signals at said output connections of said comparators, said second control signal generator being effective to change the magnitude of the control signal supplied to said second gating network at a fixed angle of said first sinusoidally varying electrical quantity following the change in the magnitude of the control signal supplied to said first introduced gating network by said first introduced control signal changing means.

11. The combination of claim 10 in which rectifying means is provided in each of said connecting means for providing unidirectional pulsating signals to said input connections of said comparators, each of said signal changing means being effective twice each cycle of said first sinusoidally varying electrical quantity to change the magnitude of the control signal at the gating network with which it is associated, said fixed angle being ninety degrees of said first sinusoidally varying electrical quantity, and signal sustainer connected intermediate said output connection of each of said comparators and said AND networks, said signal sustainer being operable to sustain the signal at said AND network produced by one of said comparators for an interval sufficient to permit a signal to be established at said AND network by the other of said comparators when the magnitude of the quantity supplied to said predetermined input connections of said other comparator is greater than said predetermined proportion of the magnitude of the quantity supplied to said other input connection of said other comparator when the said gate which controls the signal to said other comparator is subsequently actuated by the said signal changing means which is associated therewith.

12. The combination of claim 10 in which there is provided a third compensator, said third compensator being effective to provide an alternating electrical quantity at its said output terminals which has a magnitude proportional to the magnitude of an alternating electrical quantity supplied to its said input terminal and a predetermined phase angle relative to the alternating electrical quantity which is supplied to said input terminals of said third compensator, and means connecting said third compensator in one of said second and said fourth connecting means, said third compensator being arranged to provide its said output voltage in 180 degrees relationship to the alternating quantity which is proportional to the electrical quantity at the ouput terminals of the one said first and second compensators which is associated with the one of said first and second connecting means which is associated with the one of said comparators which is associated with said one connecting means.

13. A distance relay for a transmission line comprising a pair of voltage terminals adapted to be energized by the voltage of the transmission line at a selected location, a pair of current terminals adapted to be energized by the current of the transmission line at said selected location, a plurality of full wave rectifying networks, a pair of comparators, each said comparator having first and second input connections and an output connection and effective to provide a desired signal at its said output connection solely when the electrical quantity supplied to its said first input connection is of greater magnitude than that of the electrical quantity supplied to its said second input connection, a plurality of compensators, each said compensator having input terminals and output terminals and effective to provide an alternating electrical quantity at its said output terminals which is proportional to and phase shifted a selected phase angle with respect to an alternating quantity supplied to its said input terminals, a gating network having an input connection and an output connection and a control connection and effective to pass a electrical quantity from its said input connection to its said output connection solely when a selected signal is applied to its said control connections, a pair of signal generators having an input connection and an output connection and effective to provide a signal at its said output connection in fixed relation with respect to an alternating electrical quantity at its said input connection, a pair of signal sustainers, each said sustainer having an input connection and an output connection and effective to maintain a signal at its said output connection for a predetermined time interval subsequent to the removal of a control signal applied to its said input connection, first circuit means connecting said input terminals of a first of said compensators to said current terminals, second circuit means connecting said output terminals of said first compensator to said first input connection of said first comparator and including a first of said rectifiers and said first gating networks, third circuit means connecting said input connections of a first of said signal generators to said output terminals of said first compensator and said output connection of said first signal generator to said control connection of said first gating network, fourth circuit means connecting said voltage terminals to said second input connections of said first comparator, fifth circuit means connecting said input terminals of a second of said compensator to said current terminals, sixth circuit means connecting said output terminals of said second compensator to said first input connection of said second comparator and including a second of said rectifiers and a second of said gating networks, a signal generating device having input and output terminals and effective to produce a pulse at its said output terminals in timed relations to an electrical quantity applied to said input terminals, seventh circuit means connecting said control connection of said second gating network to one of said second and said sixth circuit means whereby said second gating network is actuated in timed response to the electrical quantity at said current terminals, eighth circuit means connecting said voltage terminals to said second input connection of said second comparator, an AND device having a pair of control connections and an output connection and effective to provide an output signal at its said output connection solely when both of its said control connections are supplied with a desired input signal, ninth circuit means connecting one of said pair of control connections of said AND device to said output connection of said first comparator and including a first of said sustainers, and tenth circuit means connecting the other of said pair of connection of said AND device to said output connection of said second comparator and including the other of said sustainers.

14. The combination of claim 13 in which there is provided in a selected one of said fourth and said eighth circuit means a third of said compensators, the phase angle of said third compensator being equal to the phase angle of the one of said first and said second compensators which is associated intermediate said current terminals and the one of said comparators to which the said selected one circuit means is connected, the phase angle of said second compensator being 90 degrees less the magnitude of the phase angle of said first compensator.

15. The combination of claim 14 in which said seventh circuit means connects said control connection of said second gating network to said output terminals of said second compensator and said third compensator is connected said fourth circuit means in 180 degrees phase relation to said first compensator.

References Cited

UNITED STATES PATENTS

| | | | |
|---|---|---|---|
| 3,163,802 | 12/1964 | Seguin et al. | 317—36 |
| 3,303,390 | 2/1967 | Sonnemann | 317—36 |
| 3,340,434 | 9/1967 | Riebs | 317—36 |

JAMES D. TRAMMELL, Primary Examiner

U.S. Cl. X.R.

317—33, 36